Patented Aug. 12, 1941

2,252,169

UNITED STATES PATENT OFFICE 2,252,169

OIL-TREATED MINERAL WOOL

Walter V. Cullison, Wabash, Ind., assignor to American Rock Wool Corporation, Wabash, Ind., a corporation of Indiana No Drawing. Application August 14, 1939, Serial No. 290,132

15 Claims. (Cl. 106—243)

This invention relates to mineral wool treated with a mineral oil, the characteristics of which have been modified with a small proportion of aluminum stearate and an alkaline earth, such as, for instance, magnesite. This invention also relates to said mixture and to the method of applying same to mineral wool.

Mineral wool has long been treated with mineral oil, both for the purpose of settling the dust and for rendering the mineral wool water repellent. Mineral oil has proven itself to be entirely satisfactory for dust settling for the reason that only a very small amount of the oil, less than .5% of the weight of the mineral wool, is applied to the wool to prevent the mineral wool from being dusty, but when sufficient amounts of the oil (say from 4% to 15% by weight) is used in order to render the wool even partially water repellent, the highly combustible character of the mineral oil renders the product itself combustible in the sense that the oil burns on the mineral wool fibers, without, of course, actually burning the fibers. Due to the highly combustible characteristic of mineral oil when used as a water-repellent material, it has been responsible for numerous costly and dangerous fires in the production and in the shipment of the treated wool. This fire hazard is chiefly due to the fact that lumps of incandescent coke and lava are often projected from the furnace or cupola into the settling chamber wherein the wool is deposited and these hot lumps vaporize the oil and often ignite it, sometimes causing dangerous explosions.

Another objection is that unmodified mineral oil is quite liquid. While this free flowing characteristic is undoubtedly valuable in the use of the oil as a lubricant when the oil is used in the mineral wool, its liquidity permits the oil to seep out of mineral wool fibers or settle at the bottom of a mineral wool mass or unit to such an extent as to prevent the treated material from being sufficiently water repellent to meet the demands of the trade. Furthermore when the oil is used in sufficient quantities to be of substantial value as a water-repellent material it causes the treated mineral wool to be heavy and wet or soggy. The mineral wool is not desired by the trade in this condition because of its physical condition, and for the further reason that the product will not insulate as much area as a lighter and drier product. There are a number of other objections to the employment of mineral oil as a water-repellent material, such as for instance, its tendency to float on water. This tendency of course permits water to rise in the mineral wool.

Numerous attempts have been made to find a substance for this purpose which is more satisfactory than mineral oil. Men highly skilled in the art attempted to use aluminum stearate and a mixture of aluminum stearate and talc, but the resultant mineral wool product proved to be too heavy and soggy to be generally accepted by the trade. Other attempts have been made to use zinc stearate, rosins, synthetic resins and other materials as a substitute for mineral oil but none of these substances proved to be entirely satisfactory. Zinc stearate, for instance, renders the resultant product heavy and soggy. The rosins and synthetic resins are unduly expensive and when mixed with the mineral wool are apparently unstable, as the resultant material soon becomes dusty to an objectionable degree, and may become a mere dust heap within a few years.

Others have attempted to solve the problem from a different angle and have tried to change or modify the undesirable characteristics of the mineral oil by mixing waxes, asphalts, sodium silicate, and numerous other substances with the mineral oil, but in so far as is known by the applicant, none of these attempts to modify the mineral oil has heretofore been successful.

Because of this state of the art and because of numerous complaints made by the trade, the applicant has endeavored to provide an oil-treated mineral wool which would be satisfactory to the trade, and has finally developed a very superior product which is not only water repellent to a higher degree than has been heretofore obtained by the use of mineral oil, but does not have the beforementioned undesirable characteristics heretofore imparted to mineral wool by mineral oil. Furthermore, the improved mineral oil used renders the fibers more flexible and stronger (apparently through better annealing) and generally aids in producing a more resilient and generally satisfactory mineral wool.

It is therefore among the objects of this invention to provide an improved mineral oil treated mineral wool and to provide a method of making the same.

Among the other objects are the provision of an improved mineral oil mixture adapted to serve as a superior water-repellent material when applied to mineral wool fibers and to provide a method of compounding said mixture.

The further objects of this invention will become apparent as the specification proceeds.

In treating the mineral oil I mix mineral oil with aluminum stearate and alkaline earth compound and render the mixture homogeneous by agitating and heating the mixture. I preferably, though not necessarily, first mix a refined mineral oil of medium viscosity and specific gravity with aluminum stearate, and then heat the mineral oil and aluminum stearate mixture to a temperature sufficient to render it homogeneous and translucent, or substantially transparent, and then add an alkaline substance, preferably calcined magnesite (MgO) or dehydrated lime. This last named mixture is now heated and agitated until the alkaline earth mixture is thoroughly mixed with the oil and aluminum stearate.

The agitated mixture is now ready to be applied to the mineral wool in any suitable manner, or it may be set aside to be used at a later date as the mixture has the very desirable characteristics of neither settling nor deteriorating in storage or in the finished mineral wool products.

If desired, oleic acid may be mixed with the mineral oil, preferably before the mineral oil and aluminum stearate are mixed together. In this case the amount of the aluminum stearate used may be appreciably reduced. The chief advantage in using the oleic acid lies in the fact that it is cheaper than aluminum stearate and reduces the amount of the aluminum stearate necessary in the mixture.

If the mineral wool lava is shredded by an air, gas or steam blast this improved water-repellent mixture is preferably discharged on the blast of formation. If the wool be spun on a spinning wheel the water-repellent mixture is preferably sprayed on the wool in the chamber or enclosure within which the wool is being deposited.

I have found that my water-repellent mixture may be advantageously applied to the wool in proportions ranging from .5% to 2% of the weight of the mineral wool, according to the particular characteristics desired of the finished product. The proportions of the ingredients used in the water-repellent mixture may be somewhat varied according to the particular products being made, but I have found that if this mixture be made according to any of the following formulas that the mixture aids in producing very satisfactory water-repellent mineral wool, whether the product be felted mineral wool, loose mineral wool or granulated mineral wool.

*Formula No. 1*

| | Parts |
|---|---|
| Oil | 100 |
| Aluminum stearate | 2-3 |
| Magnesite (preferably calcined) | 1-4 |

*Formula No. 2*

| | Parts |
|---|---|
| Oil | 100 |
| Aluminum stearate | 2-3 |
| Lime (preferably dehydrated) | 1-4 |

*Formula No. 3*

| | Parts |
|---|---|
| Oil | 100 |
| Aluminum stearate | 2-3 |
| Calcium carbonate | 1-4 |

*Formula No. 4*

| | Parts |
|---|---|
| Oil | 100 |
| Aluminum stearate | 2-3 |
| Magnesium carbonate | 1-4 |

*Formula No. 5*

| | Parts |
|---|---|
| Oil | 100 |
| Aluminum stearate | ½-1½ |
| Oleic acid | ½-1½ |
| Magnesite | 1-4 |

When the mineral oil is prepared and applied in accordance with the teachings of this invention it is well adapted to provide a lighter and more resilient, water-repellent and fire-resistant mineral wool than could be obtained with any other mineral mixture known to the applicant. This is due to the fact that this improved mixture provides a stiff coating on the individual mineral wool fibers and therefore aids these fibers in maintaining their desired spaced apart relationship to each other. It has been found that this unusual stiffening characteristic is due to the effect of the alkaline earth compound on the aluminum stearate in the mixture, but it is not known whether this effect is due to chemical or physical phenomenon, or both.

Another excellent feature of this improved mineral oil mixture is that it can be advantageously used with resinous binding materials in the making of mineral wool batts. The addition of this improved mineral oil mixture, even in a small proportion, substantially reduces the well-known tendency of the resinous binding materials to become dusty or useless. Usually these resinous binding materials are mixed with mineral oil and other substances before they are applied to the mineral wool batts. When this is the case I prefer to add to the mineral oil, ordinarily included in these resins, 2% of the mineral oil mixture. In the event that no untreated mineral oil is used from .2% to .5% by weight of the water-repellent mixture may be advantageously added in any suitable manner to the resinous binding materials before these materials are applied to the mineral wool.

It will be, of course, understood that each of these formulas may be slightly modified without rendering the improved mineral oil mixture suitable for the purposes intended, but it is my experience that if these formulas be used that superior products will be obtained.

I claim:

1. An article of manufacture comprising mineral wool coated with a water-repellent material consisting of a homogeneous mixture of mineral oil, aluminum stearate, and an alkaline earth compound, said compound being selected from the group consisting of an oxide or carbonate of one of the elements, calcium and magnesium.

2. An article of manufacture comprising mineral wool coated with a water-repellent material consisting of a homogeneous mixture of mineral oil, aluminum stearate, and an alkaline earth compound, said mineral wool constituting at least 90% of said article of manufacture, and said mineral oil constituting at least 90% of the water-repellent material, said compound being selected from the group consisting of an oxide or carbonate of one of the elements, calcium and magnesium.

3. An article of manufacture comprising mineral wool coated with a water-repellent material consisting of a homogeneous mixture of mineral oil, aluminum stearate, and magnesite.

4. An article of manufacture comprising mineral wool coated with a water-repellent material consisting of a homogeneous mixture of mineral oil, aluminum stearate, and lime.

5. An article of manufacture comprising mineral wool coated with a water-repellent material, said material consisting of a homogeneous mixture of mineral oil, aluminum stearate, and calcium carbonate.

6. An article of manufacture comprising mineral wool coated with a water-repellent material, said material consisting of a homogeneous mixture consisting of mineral oil, aluminum stearate, and magnesium carbonate.

7. An article of manufacture comprising mineral wool coated with a water-repellent material, said material consisting of a homogeneous mixture consisting of mineral oil, stearic acid and aluminum stearate, and an alkaline earth compound, said compound being selected from the group consisting of an oxide or carbonate of one of the elements, calcium and magnesium.

8. An article of manufacture comprising mineral wool coated with a water-repellent material, said material consisting of a homogeneous mixture consisting of mineral oil, stearic acid and aluminum stearate, and magnesite.

9. A mineral oil repellent substance adapted for use in treating mineral wool, said substance consisting of a homogeneous mixture of mineral oil, aluminum stearate, and an alkaline compound, said compound being selected from the group consisting of an oxide or carbonate of one of the elements, calcium and magnesium.

10. A mineral oil substance adapted to be coated on mineral wool fibers to render said fibers water-repellent, said substance consisting of a homogeneous mixture of mineral oil, aluminum stearate, and an alkaline compound, said mineral oil comprising at least 90% of the weight of said substance and said aluminum stearate and said alkaline compound each consisting of at least 1% of the weight of said substance, said compound being selected from the group consisting of an oxide or carbonate of one of the elements, calcium and magnesium.

11. The method of making a water-repellent, fire-resistant mineral wool product, said method comprising heating and agitating a mixture of mineral oil, aluminum stearate, and an alkaline earth compound until said mixture becomes homogeneous, and thereafter applying said mixture to mineral wool fibers of said product in such proportion that the mineral wool constitutes at least 90% of the weight of said finished product, said compound being selected from the group consisting of an oxide or carbonate of one of the elements, calcium and magnesium.

12. The method of making a water-repellent, fire-resistant mineral wool, said method comprising heating and agitating a mixture of mineral oil, aluminum stearate and magnesite until said mixture becomes homogeneous and thereafter applying said mixture to mineral wool fibers.

13. The method of making a water-repellent, fire-resistant mineral wool mass, said method comprising heating and agitating a mixture of mineral oil, aluminum stearate and lime until said mixture becomes homogeneous and thereafter applying said mixture to newly formed mineral wool fibers.

14. The method of making a water-repellent, fire-resistant mineral wool product, said method comprising heating and agitating a mixture of mineral oil, aluminum stearate, and calcium carbonate until said mixture becomes homogeneous and thereafter applying said mixture to newly formed mineral wool fibers.

15. The method of making a water-repellent, fire-resistant mineral wool product, said method comprising heating and agitating a mixture of mineral oil, aluminum stearate, and magnesium carbonate until said mixture becomes homogeneous and thereafter applying said mixture to newly formed mineral wool fibers.

WALTER V. CULLISON.